(12) United States Patent
Amir

(10) Patent No.: US 8,779,941 B2
(45) Date of Patent: Jul. 15, 2014

(54) PROVIDING GUIDANCE FOR LOCATING STREET PARKING

(75) Inventor: Eyal Amir, Chicago, IL (US)

(73) Assignee: AI Incube, Inc., Chicago, IL (US)

( * ) Notice: Subject to any disclaimer, the term of this patent is extended or adjusted under 35 U.S.C. 154(b) by 446 days.

(21) Appl. No.: 13/008,868

(22) Filed: Jan. 18, 2011

(65) Prior Publication Data

US 2012/0161985 A1 Jun. 28, 2012

Related U.S. Application Data

(60) Provisional application No. 61/427,388, filed on Dec. 27, 2010, provisional application No. 61/428,681, filed on Dec. 30, 2010.

(51) Int. Cl.
*B60Q 1/48* (2006.01)

(52) U.S. Cl.
USPC ........................................ 340/932.2; 701/400

(58) Field of Classification Search
USPC ............... 340/932.2, 939, 468, 505; 701/400, 701/414, 465
See application file for complete search history.

(56) References Cited

U.S. PATENT DOCUMENTS

| | | | |
|---|---|---|---|
| 5,910,782 A | 6/1999 | Schmitt et al. | |
| 6,927,700 B1 * | 8/2005 | Quinn | 340/932.2 |
| 7,966,150 B2 | 6/2011 | Smith et al. | |
| 2006/0136131 A1 | 6/2006 | Dugan | |
| 2006/0200478 A1 | 9/2006 | Pasztor et al. | |
| 2008/0048885 A1 * | 2/2008 | Quinn | 340/932.2 |
| 2008/0262714 A1 * | 10/2008 | Abramovich Ettinger | ... 701/201 |
| 2009/0171567 A1 * | 7/2009 | Morimoto et al. | ............ 701/204 |
| 2009/0179776 A1 | 7/2009 | Holden | |
| 2009/0187341 A1 | 7/2009 | Vavrus et al. | |
| 2010/0007525 A1 | 1/2010 | Shanbhag et al. | |
| 2010/0042318 A1 | 2/2010 | Kaplan et al. | |
| 2010/0085214 A1 | 4/2010 | Kim | |
| 2010/0117820 A1 | 5/2010 | Mitschele | |
| 2010/0153222 A1 | 6/2010 | Pandey | |
| 2011/0140922 A1 * | 6/2011 | Levy et al. | ................. 340/932.2 |
| 2012/0098677 A1 * | 4/2012 | Geelen | ...................... 340/932.2 |

FOREIGN PATENT DOCUMENTS

| | | |
|---|---|---|
| KR | 100814252 B1 | 3/2008 |
| KR | 1020090023856 | 3/2009 |

OTHER PUBLICATIONS

Baum, A maximizing technique occurring in the Statistical Analysis, Annals of Mathematical Statistics, 4, 1970, 8 pages.
Caliskan, Decentralized Discovery of Free Parking Places, International conference on Mobile Computing and Networking. Proceedings of the 3rd, 10 pages.
Cover, Neighbor Pattern Classification Nearest Neighbor Pattern, Transactions on Information Theory, Jan. 1967, 7 pages.
Doucet, Raoblackwellised Particle Filtering, Conference on Uncertainty in Artificial Intelligence, Jun. 2000, 10 pages.
Ergun, Development of Downtown Parking Model, Highway Research Record, 1971, 18 pages.

(Continued)

*Primary Examiner* — Kerri McNally
(74) *Attorney, Agent, or Firm* — Perkins Coie LLP

(57) ABSTRACT

A facility for providing guidance for locating street parking is described. The facility receives an indication of a geographic location with respect to which provide parking guidance, and determines an effective time for which to provide guidance. The facility then provides parking guidance relating to the indicated location at the effective time for a use.

25 Claims, 15 Drawing Sheets

(56) References Cited

OTHER PUBLICATIONS

Hajishirzi, Greedy Algorithms for Sequential Sensing Decisions, Proc. Twenty first International Joint Conference on Artificial Intelligence, 2009, 8 pages.

Hajishirzi, Sampling First-Order Logical Particles, Proc. Twenty Fourth Conference on Uncertainty in Artificial Intelligence, 2007, 10 pages.

Hensher, Parking Demand and Responsiveness to Supply Pricing, Transportation Research Policy and Practice, 2006, 20 pages.

Hill, Real Time Bayesian Anomaly Detection for Environmental Sensor, 32nd Congress of IAHE, 2007, 10 pages.

Kalman, Journal of Basic Engineering, A New Approach to Linear Filtering and Prediction Problems, 1960, 11 pages.

Kearns, Efficient Reinforcement Learning in Factored MDPs, Proc. Seixteenth International Joint Conference on Artificial Intelligence, 1999, 10 pages.

Khattak, Effect of Parking Information on Travelers Knowledge, Transportation, 1993, 21 pages.

Lam, Balance of Demand and Supply of Parking Space, 14th International Symposium on Transportation and Traffic Theory, 1999, 27 pages.

Litman, Parking Management Comprehensive Implementation Guide, Technical Report Victoria Transport Policy Institute, 2010, 81 pages.

Mullan, Do You Think That Your Local Area is a Good Place for Young People to Grow Up, Health & Place, 2003, 10 pages.

Quinlan, Induction of Decision Trees, Machine Learning 1985, 26 pages.

Ratitch, Using MDP Characteristics to Guide Exploration iEuro Conference on Machine Learning, 2003, 12 pages.

Shoup, Cruising for Parking, Transport Policy, 2006, 8 pages.

Thompson, A Parking Search Model Transportation Research Part A Policy and Practice, 1998, 12 pages.

Duda et al., "Pattern Classification," 2001, pp. 84-160 and pp. 394-413.

Kelejian and Oates, "Introduction to Econometrics," 1989.

Pearl, "Probablilistic Reasoning in Intelligent Systems: Networks of Plausible Inference," 1988, pp. 77-233.

Sutton and Barto, "Reinforcement Learning: An Introduction," 1998, pp. 51-110.

Hajishirzi, Stochastic Filtering National Conf. on AI, 2007, 10 pages.

International Search Report and Written Opinion for PCT Application No. PCT/US2011/067392 filed Dec. 27, 2011, mailed Oct. 4, 2012, 12 pages.

Final Office Action for U.S. Appl. No. 13/008,861, Mail Date Oct. 28, 2013, 11 pages.

Non-Final Office Action for U.S. Appl. No. 13/008,861, Mail Date Feb. 28, 2013, 19 pages.

Non-Final Office Action for U.S. Appl. No. 13/008,873, Mail Date Feb. 28, 2013, 17 pages.

* cited by examiner

FIG. 6 segment availability observation table — 600

| segment id | date | time | day of week | free | | | pay | | | pay | | | event id |
|---|---|---|---|---|---|---|---|---|---|---|---|---|---|
| | | | | micro | small | large | micro | small | large | micro | small | large | |
| 569932 | 11/3/2010 | 13:10 | Wednesday | 1 | 4 | 1 | 0 | 0 | 0 | 0 | 0 | 0 | |
| 569932 | 11/4/2010 | 19:21 | Thursday | 2 | 1 | 0 | 1 | 6 | 2 | 0 | 0 | 0 | |
| 569932 | 11/6/2010 | 14:47 | Saturday | 0 | 2 | 0 | 0 | 3 | 3 | 0 | 0 | 0 | 9103 |

FIG. 7 segment attribute table — 700

| segment id | latitude | longitude | number of slots | day rate | night rate | hours limit day | hours limit night | cluster | class |
|---|---|---|---|---|---|---|---|---|---|
| 569932 | 41.964822 | -87.651415 | 14 | $2.50 | $0 | 2 | none | 5 | 5 |
| 569971 | 41.964829 | -87.651494 | 22 | $5.00 | $0 | 2 | 1 | | 5 |

FIG. 8 event information table — 800

| event id | date | begin time | end time | latitude | longitude | expected attendance | type |
|---|---|---|---|---|---|---|---|
| 9103 | 11/6/2010 | 13:00 | 16:00 | 41.964819 | -87.651415 | 50000 | sports |
| 9211 | 11/6/2010 | 19:00 | 21:30 | 41.879036 | -87.624872 | 5000 | symphony |

PROVIDING GUIDANCE FOR LOCATING STREET PARKING

CROSS REFERENCE TO RELATED APPLICATIONS

This application claims the benefit of U.S. Provisional Application No. 61/427,388, filed on Dec. 27, 2010, and U.S. Provisional Patent Application No. 61/428,681, filed on Dec. 30, 2010, each of which is hereby incorporated by reference in its entirety.

This application claims the benefit of U.S. patent application Ser. No. 13/008,861 and U.S. patent application Ser. No. 13/008,873 each filed concurrently herewith and each of which is hereby incorporated by reference in its entirety.

TECHNICAL FIELD

The described technology is directed to the field of decision support tools, and, more particularly, to the field of decision support tools for drivers.

BACKGROUND

A driver of a vehicle who wishes to visit a destination often must locate a parking spot in which to park the vehicle during the visit. Various kinds of parking spots may be available, including parking spots in public or private garages, outdoor lots, and along the curbs of streets.

The spots along curbs of streets ("street parking spots," or simply "spots") may be free to park in, or may require payment. Spots may be available to all or may be restricted, at least on certain days and/or certain times, to those explicitly authorized to park in such spots.

Spots may be characterized by their size, such as being characterized as one of a large spot, a small spot, or a micro spot.

BRIEF DESCRIPTION OF THE DRAWINGS

FIG. 6 is a table diagram showing a sample segment availability observations table maintained by the facility in some embodiments.

FIG. 7 is a table diagram showing a sample segment attribute table maintained by the facility in some embodiments.

FIG. 8 is a table diagram showing a sample event information table contained by the facility in some embodiments.

DETAILED DESCRIPTION

Figure 1:
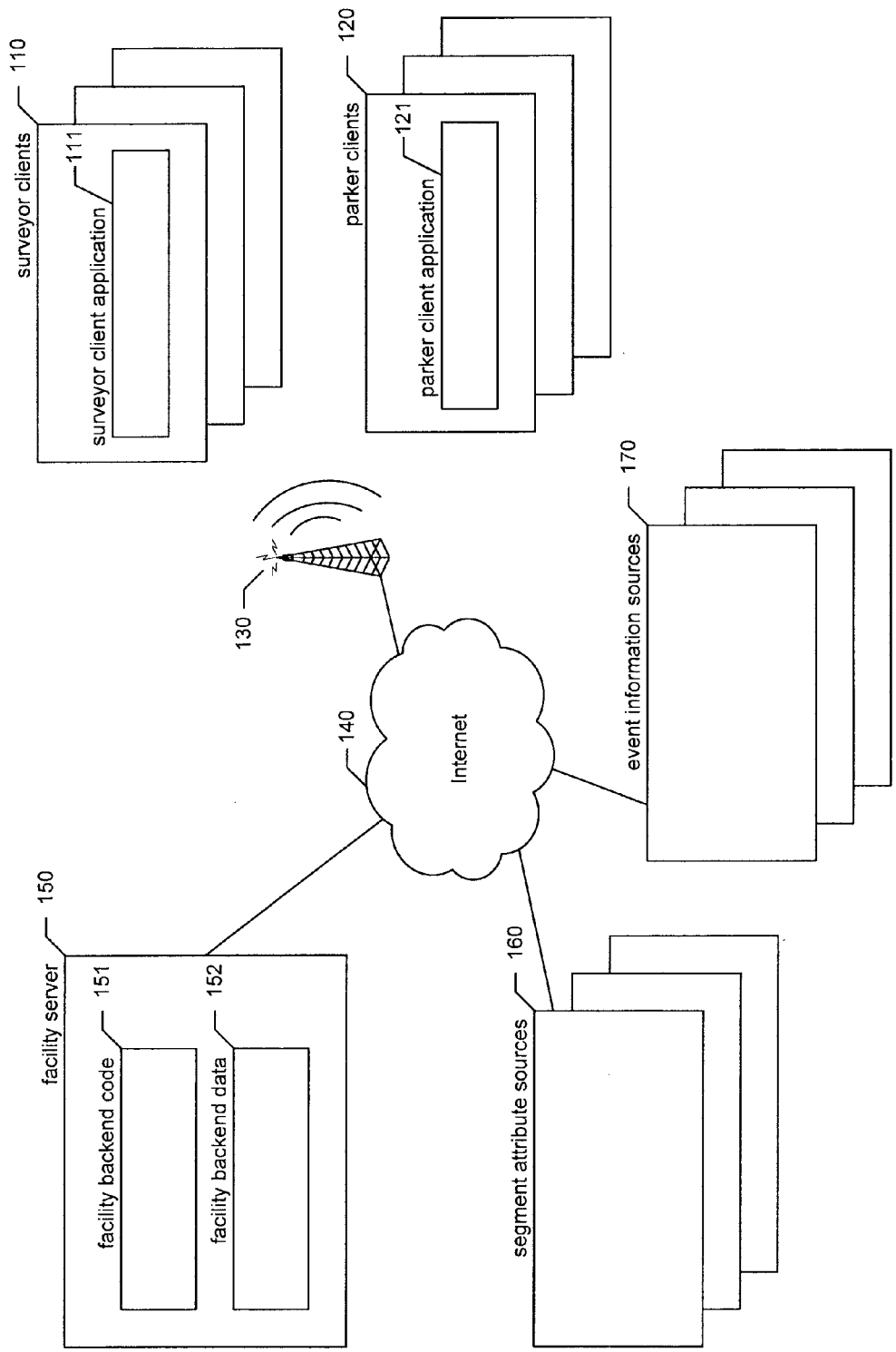
FIG. 1 is a network diagram showing an arrangement of components used to provide the facility in some embodiments.

The inventors have recognized that street parking spots often offer advantages over parking spots of other kinds, including being less expensive; being more easily and quickly identified as available while driving; being more easily and quickly accessed while driving; and being more easily and quickly accessed while walking. The inventors have further recognized that, at least when seeking a street parking spot near certain destinations at certain times on certain days, locating such a street parking spot can be extremely difficult, leading to frustration and wasted time on the part of the driver seeking the street parking spot, as well as additional societal costs such as traffic congestion, fuel consumption, pollution, accidents, etc.

Accordingly, the inventors have designed a hardware and/or software facility for providing guidance for locating street parking ("the facility"). In some embodiments, the facility presents to a user attempting to find street parking spot near a particular destination at a particular time on a particular day a recommended route for finding street parking, such as via a smartphone or other suitable device that can be installed in or carried into a vehicle. The facility generates this route based on determining, for each of a number of street parking regions called "parking segments" or "segments," a probability that at least one suitable street parking spot will be available in the segment. In some embodiments, the facility defines a segment as a block of a street, that is, the portion of a particular street that falls between two successive cross streets. The facility in turn determines this probability for each of these segments based upon earlier observations of space availability in the segment at the same or similar times and days of week. In various embodiments, these observations of space availability may come from dedicated surveyors, and/or from users using the facility to find parking. Where the facility has received a number of applicable availability observations for a segment that is inadequate for directly determining the segment's probability, the facility determines the segment's probability using a statistical model that predicts an expected number of available spots in a segment based upon attributes of the segment, such as total number of spots, geographic location, link, and number of businesses; context information such as date, time, date week, and current weather; and information about events that may impact parking such as sporting events, school attendance, and holidays. In some embodiments, the facility generates separate such models for different classes of segments. In order to determine these segment classes, the facility first analyzes segments for which at least a minimum number of availability observations have been received, and clusters these segments in order to collect in each cluster segments having similar available spots versus time curves. The facility then uses these clusters to construct a classification tree to predict to which cluster a segment should belong based upon its attributes. The facility proceeds to apply the constructed classification tree to assign each segment, on the basis of its attributes, to one of a number of classes that correspond one-to-one with clusters, irrespective of the number of availability observations received for the segment.

In some embodiments, the facility displays a prediction of how long it will take to locate street parking near particular destination a particular time, when using the facility to search, when not using the facility to search, or both. In some embodiments, the facility presents an indication of the probability of finding street parking in a number of different segments near a destination at a particular time, such as by displaying a map in which segments are colored using colors that each correspond to a different range of probabilities.

In some embodiments, the facility provides a wireless client application having a special user interface by use by surveyors to record the results of their surveys of the availability of parking spots in particular segments at particular times.

By behaving in some or all of the ways described above, the facility helps users to more efficiently find street parking near a destination, and/or select destinations and times to go there that will minimize the time required to find street parking, reducing driver frustration and the adverse societal impacts of searching inefficiently for street parking.

FIG. 1 is a network diagram showing an arrangement of components used to provide the facility in some embodiments. Surveyors interact with a surveyor application 111 executing on a number of surveyor clients 110—such as smartphones or similar mobile devices—to explicitly generate availability observations based on their surveys of parking availability. A parker client application 121 executing on a number of parker clients 120—such as smartphones, GPS receivers, automobile computers, laptops, tablet computers, or similar mobile devices—implicitly generates availability observations based upon attempts by parkers to park. These availability observations are transmitted wirelessly, such as via a wireless base station 130, and then via the Internet 140 or other network, to a facility server 150. In the facility server, the observations are stored among facility backend data 152 by facility backend code 151. The facility backend code also causes to be stored among the facility backend data segment attributes received from segment attribute sources 160, as well as event information received from event information sources 170. The facility backend code further causes to be generated and stored among facility backend data expected availability models, segment classification trees, and segment classification results. The facility backend code uses various facility backend data to service requests generated by parkers using the parker client application.

In various embodiments, various aspects of functionality attributed to the facility server above are distributed to parker clients, including, in various embodiments, the servicing of parking requests from availability models, construction of availability models, and/or receipt or retrieval of data upon which availability models are based. In such embodiments, needed data and/or code can be preloaded onto parker clients, loaded as part of installing a parking client application, and/or provided or updated later.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
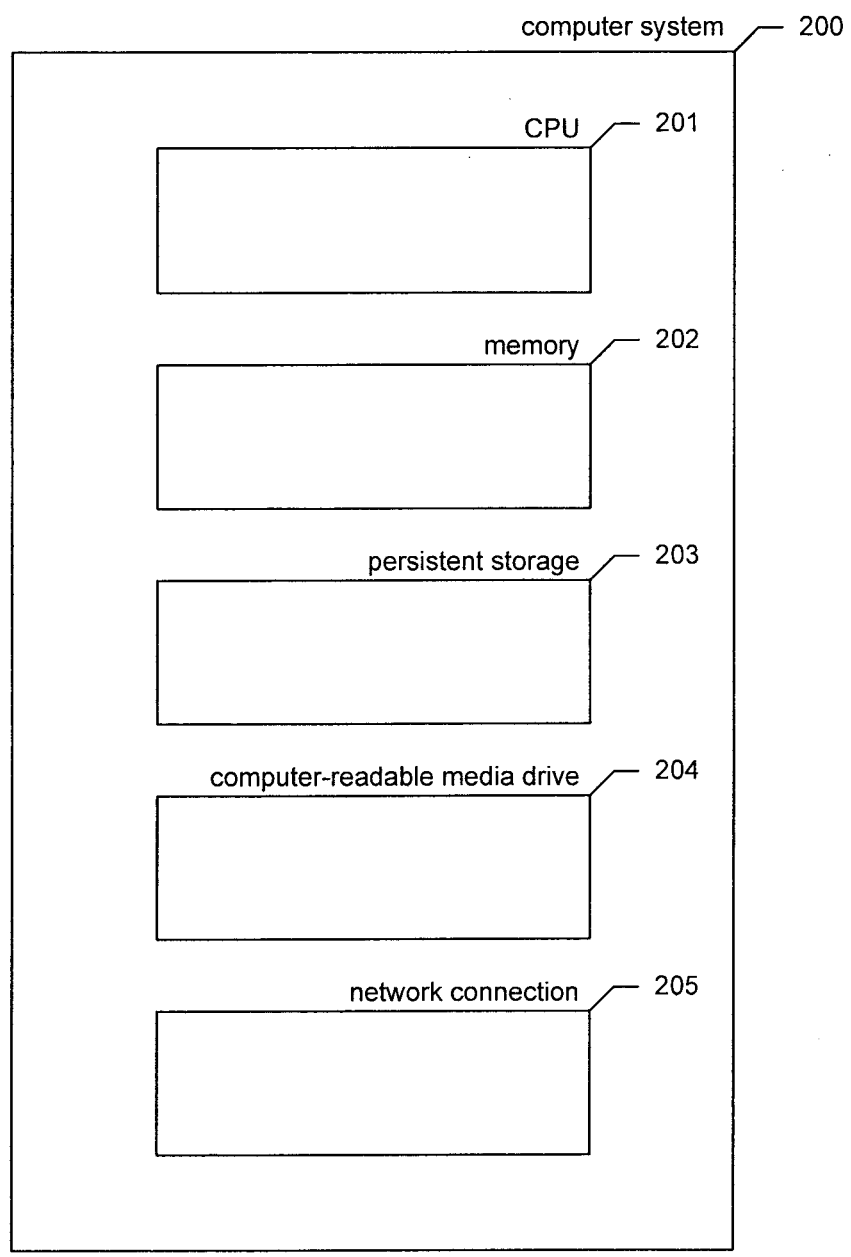
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, desktop computer systems, laptop computer systems, mobile phones, personal digital assistants, tablet computers, televisions, cameras, automobile computers, automobile computers interacting in a wireless and/or wired manner with another device carried into the automobile such as a mobile phone or laptop computer system, electronic media players, etc. In various embodiments, the computer systems and devices include zero or more of each of the following: a central processing unit ("CPU") 201 for executing computer programs; a computer memory 202 for storing programs and data while they are being used; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet, a wireless network, or another network and its networking hardware. While computer systems configured as described above are typically used to support the operation of the facility, those skilled in the art will appreciate that the facility may be implemented using devices of various types and configurations, and having various components.

Figure 3:
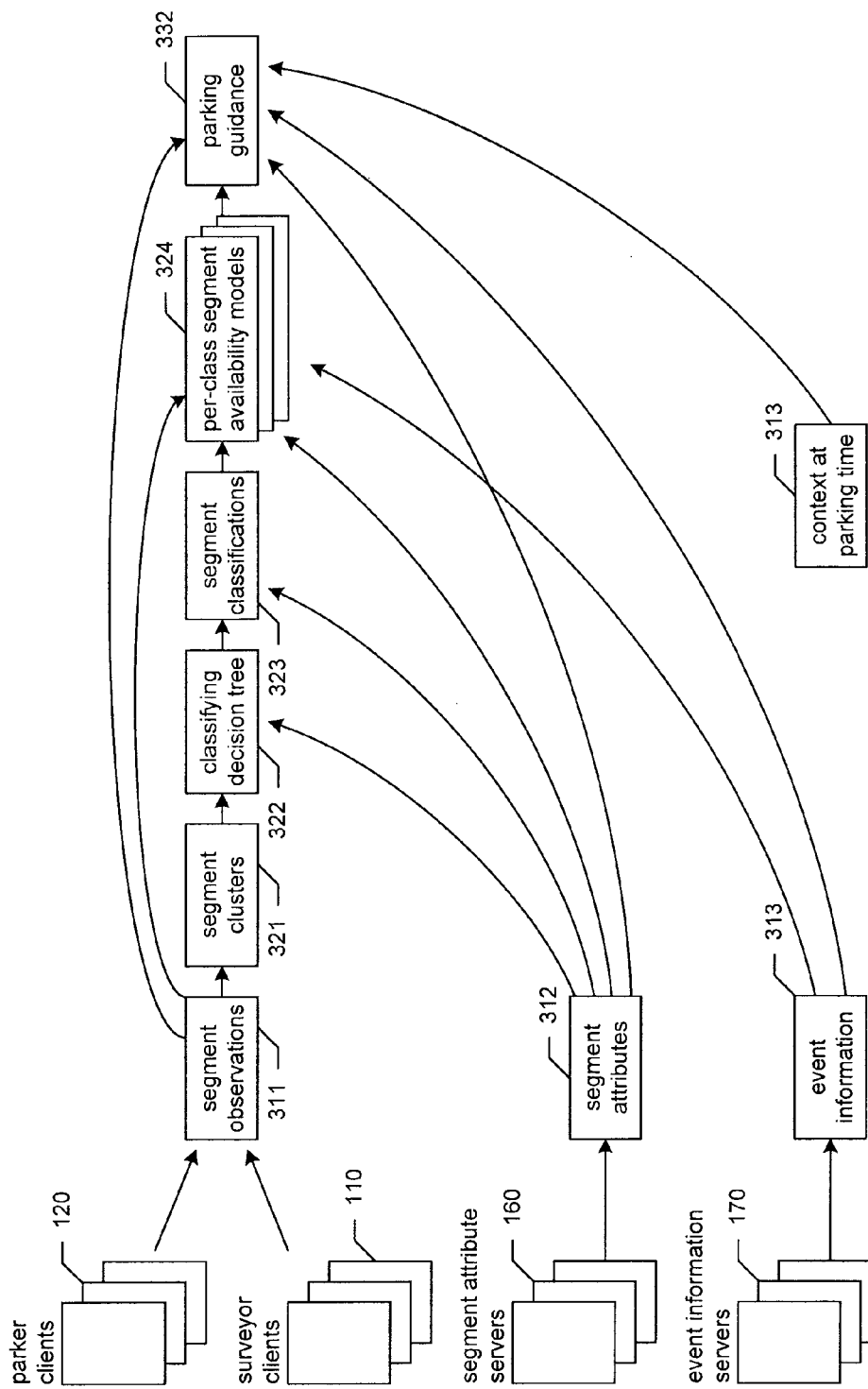
FIG. 3 is a data flow diagram showing how data is transformed by the operation of the facility.
Figure 4:
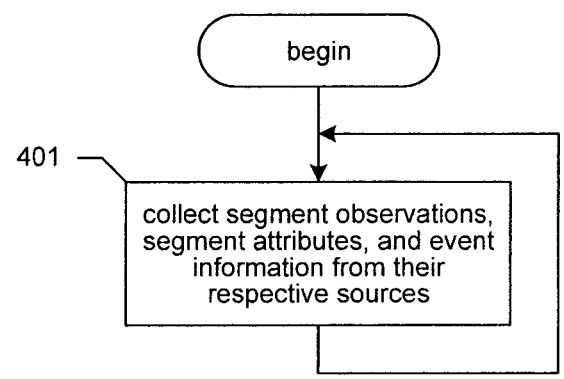
FIG. 4 is a flow diagram showing steps performed by the facility in some embodiments in order to collect inputs to the facility.

FIG. 3 is a data flow diagram showing how data is transformed by the operation of the facility. Segment availability observations 311 ("segment observations") each reflecting the availability of parking in a particular segment at a particular time are received by the facility from parker clients 120 and surveyor clients 110. FIG. 4 discussed below shows how the facility receives the segment observations, while FIG. 6 discussed below shows sample received observations. Parker clients and their generation of segment observations are discussed below in connection with FIGS. 13A-13C, while surveyor clients and their generation of segment observations are discussed below in connection with FIG. 5. The facility further receives segment attributes 312 from segment attribute servers 160. FIG. 7 discussed below shows sample received segment attributes. The facility also receives event information 313 from event information servers 170. FIG. 8 discussed below shows sample received event information.

Figure 14:
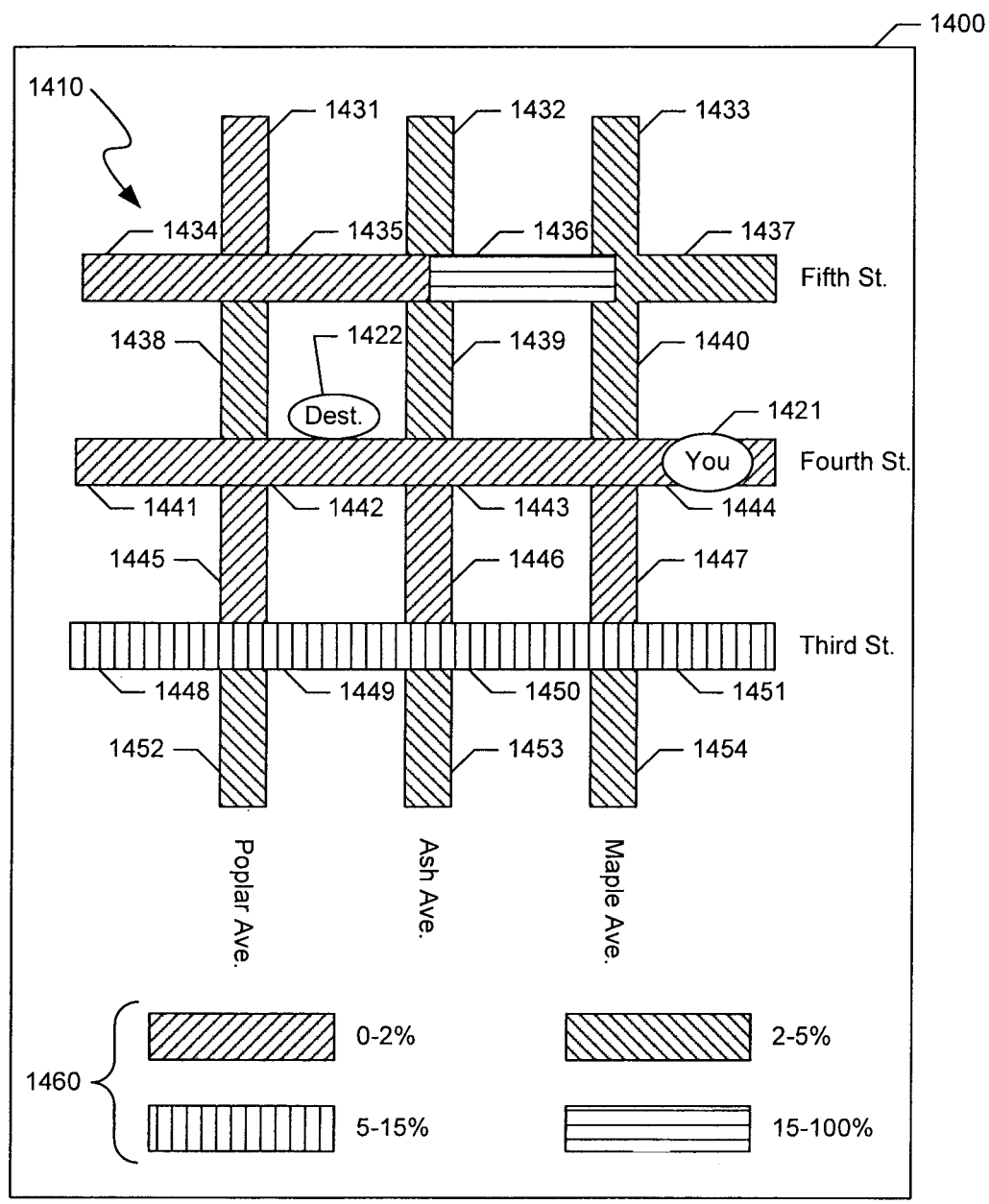
FIG. 14 is a user interface diagram showing a sample display presented by the facility in a parker client in some embodiments that shows the probability of finding parking in different segments near the destination.
Figure 15:
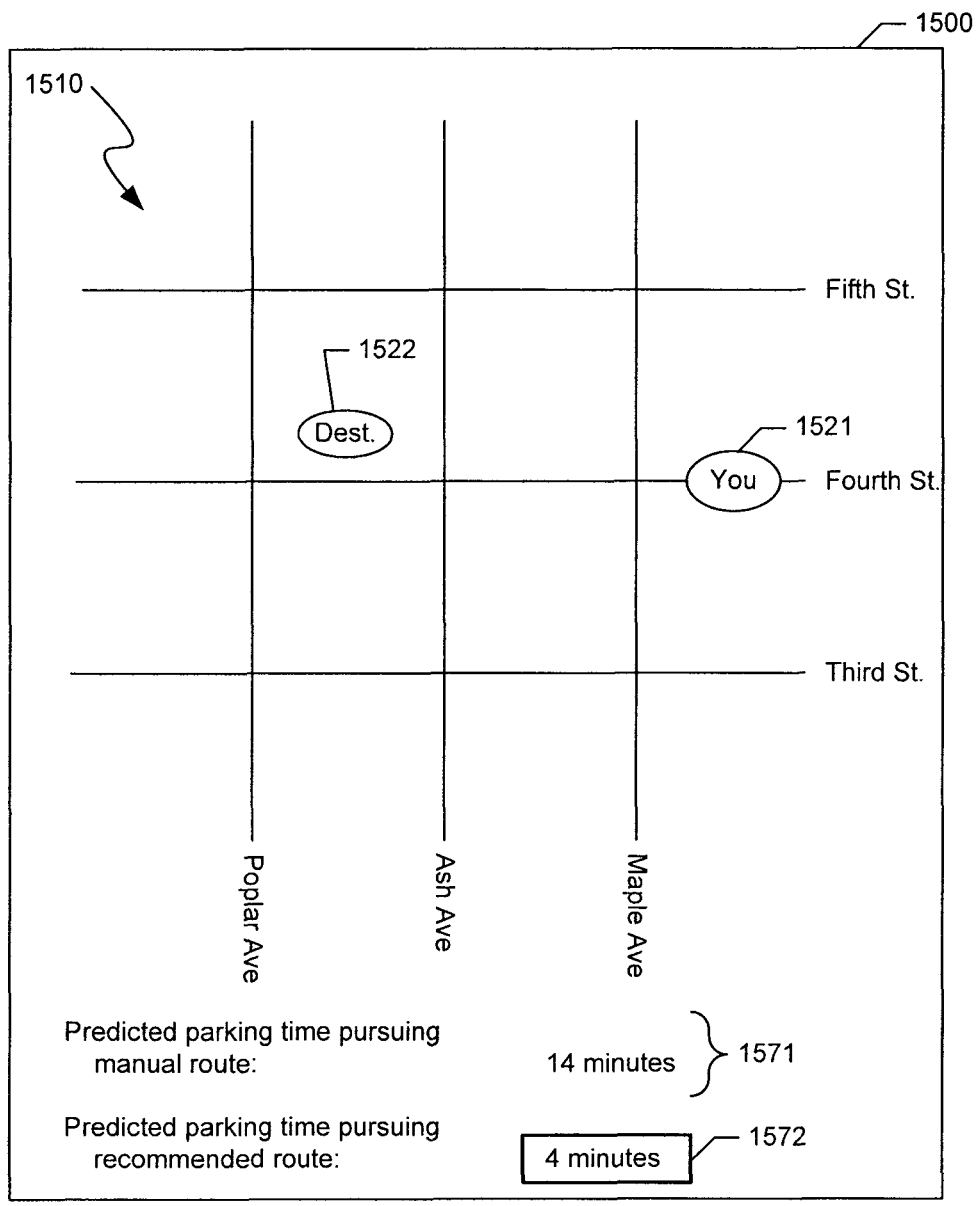
FIG. 15 is a user interface diagram showing a sample display presented by the facility in a parker client in some embodiments that shows the amount of time the facility predicts it will take for the user to find parking near the destination.

From segment observations, the facility generates segment clusters 321, such that segments known to have similar patterns of availability are included in the same cluster. This process is discussed below in connection with step 901 shown in FIG. 9, and FIG. 10. From these segment clusters and the received segment attributes, the facility constructs a classifying decision tree 322 for classifying any segment into a segment class corresponding to one of the segment clusters based upon its attributes. This process is discussed below in connection with step 902 shown in FIG. 9. A sample decision tree constructed by the facility is shown in FIG. 11. The facility uses the constructed decision tree and the segment attributes to classify each segment for which segment attributes are available, generating segment classifications 323. This process is discussed below in connection with step 903 shown in FIG. 9. The facility then uses these segment classifications, together with the segment observations, segment attributes, and event information to generate segment availability models 324 for each class of segments. This process is discussed below in connection with step 904 shown in FIG. 9. In some embodiments, the facility generates these segment models in advance of receiving the requests that rely on them. In some embodiments, however, the facility generates a particular segment model only in response to a request for parking guidance that relies upon it. The facility then uses the models, and/or the segment observations, together with the segment attributes, the event information, and the context 313 at parking time to generate parking guidance 332 and provide it to a user. This process is described below in connection with FIG. 12. Sample parking guidance provided by the facility is shown in FIGS. 13C, 14, and 15.

FIG. 4 is a flow diagram showing steps performed by the facility in some embodiments in order to collect inputs to the facility. In step 401, the facility collects segment observations, segment attributes, and event information from their respective sources.

In some embodiments, in order to collect segment observations from surveyor clients, the facility receives explicit segment availability reports from surveyors, such as via mobile wireless clients. In various embodiments, the surveyors enter these reports into a web interface, a database front end, a spreadsheet, etc.

In some embodiments, while the user is using the facility to search for a parking spot, the facility receives automatic reports from the user's parker client. Where the user proceeds through an entire segment without stopping for more than a threshold period of time, such as 2 minutes, the facility infers that the user did not park, and further infers that no spot acceptable to the user was available when the user passed through the segment. Accordingly, in this situation, the facility registers an observation that no spots of types and sizes known to be acceptable to the user were available in the segment at the time the user passed through it. Where the user stops in a segment for more than a threshold period of time, the facility infers that the user has parked in the segment. Accordingly, in this situation, the facility registers an observation that at least one spot of a type and size known to be acceptable to the user was available in the segment at the time the user stopped in it.

In some embodiments, the facility collects segment parking availability observations from a variety of other kinds of sources. For example, in various embodiments, the facility obtains segment observations from one or more of the following: cameras observing the level of use of spots in the segment, or the rates at which cars are entering and leaving the segment; proximity sensors observing the level of use of spots in the segment, or the rates at which cars are entering and leaving the segment; low-level visual sensors observing the level of use of spots in the segment, or the rates at which cars are entering and leaving the segment; and pressure sensors observing the level of use of spots in the segment, or the rates at which cars are entering and leaving the segment. In some embodiments, the facility receives segment observations from a third-party provider, in some cases with limited information about and control over how these segment observations are generated.

In some embodiments, the facility progressively ages and/or expires older segment observations, to place greater emphasis on recent data.

In some embodiments, the facility retrieves and/or is pushed segment attributes from computer systems operated by parties who possess segment attribute information, such as cities or other levels of government, private street parking contractors, or information aggregators. In some embodiments, such information is entered manually.

In some embodiments, the facility retrieves and/or is pushed event information from computer systems operated by parties who possess event information, such as cities or other levels of government, event organizers or operators, school systems, public transit bodies, weather services, event aggregators, or information aggregators. In some embodiments, such information is entered manually After step 401, the facility's continues in step 401 to continue collecting input information.

Those skilled in the art will appreciate that the steps shown in FIG. 4 and in each of the flow diagrams discussed below may be altered in a variety of ways. For example, the order of the steps may be rearranged; some steps may be performed in parallel; shown steps may be omitted, or other steps may be included; a shown step may divided into substeps, or multiple shown steps may be combined into a single step, etc.

Figure 5:
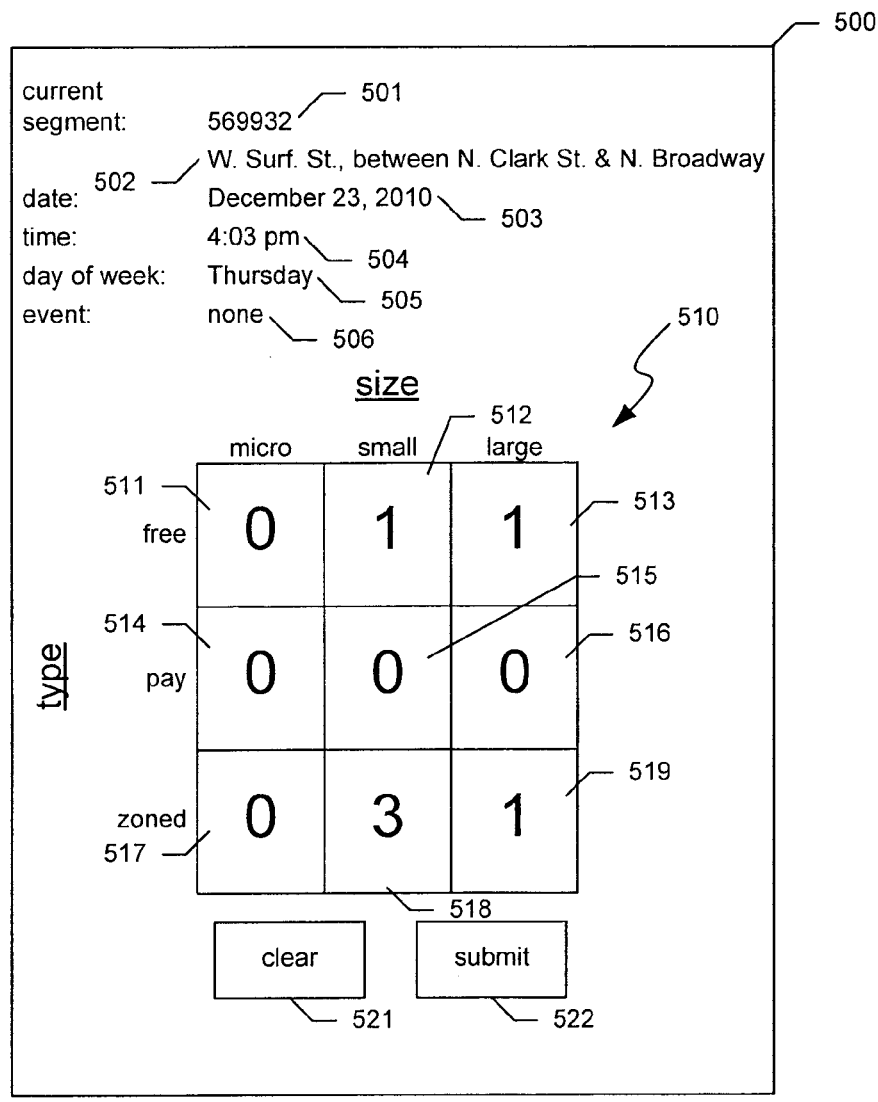
FIG. 5 is a user interface diagram showing a sample visual user interface presented a by the facility in a surveyor client in some embodiments.

FIG. 5 is a user interface diagram showing a sample visual user interface presented a by the facility in a surveyor client in some embodiments. In the sample visual user interface 500, the facility presents information about the segment in which the surveyor currently finds herself—in some embodiments automatically obtained via GPS or other location-sensing technology supported in the surveyor client—such as segment ID 501, and segment description 502. The segment observation generated by the surveyor client will specify this segment. The user interface further indicates the current date 503, time 504, and day of week 505. This information will similarly be included in the segment observation to be recorded. If the facility has information about an event currently in progress near the segment, it is displayed in position 506 and stored as part of the generated segment observation. The user interface also includes a grid 510 made up of buttons 511-519 each corresponding to a different combination of spot size and spot type. For example, button 512 corresponds to small, free spots. Each button displays a count that is initialized to zero when the surveyor enters a new segment. Each time the surveyor presses a button, the count in it is incremented. For example, button 518 came to have a count of three by the surveyor pressing this button three times, in response to seeing three available small, zoned spots in the segment. Were the surveyor to press button 512 while the user interface is in the shown state, the count in button 512 would be incremented from 1 to 2. If the surveyor makes an error, she can press a clear button 521 two reinitialize all of the counts to zero. In some embodiments, the facility permits the surveyor to reinitialize the count of only a single button, such as by pressing and holding the button. Once the surveyor has completed her survey of the current segment, she presses a submit button 522 in order to generate a segment observation for the segment that is based on the current counts. In some embodiments, the facility automatically generates the segment observation in response to detecting that the surveyor has departed the segment without any need for the surveyor to press a submit button. In various embodiments, the facility directs the surveyor to the next segment to be surveyed, displays a map showing segments that still need to be surveyed, etc.

FIG. 6 is a table diagram showing a sample segment availability observations table maintained by the facility in some embodiments. The table 600 is made up of rows, such as sample rows 601-603, which are each divided into the following columns: segment ID column 611; observation date column 612; observation time column 613; observation day of week column 614; free, micro count column 615; free, small count column 616; free, large count column 617; pay, micro count column 618; pay, small count column 619; pay, large count column 620; zoned, micro count column 621; zoned, small count column 622; zoned, large count column 623; and event ID column 624. For example, row 601 indicates that at 1:10 pm on Nov. 3, 2010, a segment having segment ID 569932 had only the following available spots: one free, micro spot; four free, small spots; and one free, large spot. The event ID 9103 in the event ID column of row 603 indicates that, at the time of this observation, an event having this event ID was in progress near the observed segment.

While FIG. 6 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or otherwise encoded; etc.

FIG. 7 is a table diagram showing a sample segment attribute table maintained by the facility in some embodiments. The table 700 is made up of rows, such as sample rows 701-702, which are each divided into the following columns: segment ID column 711; latitude column 712; longitude column 713; number of spots column 714; day rate column 715; night rate column 716; hours limit day column: 717; hours limit night column 718; cluster column 719; and class column 720. For example, row 701 corresponds to a segment having segment ID 569932, located at latitude 41.964822 and longitude −87.651415. It has 14 parking slots, a day rate of $2.50, and is free at night. Parking is limited to two hours during the day, and unlimited at night. The facility has clustered this segment into cluster 5, and classified it into class 5.

In various embodiments, the facility collects and maintains a variety of segment attributes for segments, such as any combination of the following:

TABLE 1

GIS Type
number of bars close by
number of bars close to ends
number of businesses close by
number of businesses on street
max number of pay stalls -- maximum number of available metered spots
number of restaurants close by
number of restaurants close to end
road Geo-Dir (4 values: EW, SN, ENSW, ESNW)
road length
road not for driving? (yes/no)
road no outlet
one way?
road to/from bi-directional street? (yes/no) -- returns whether segment connects to a bi-directional road (and is not one itself), noting whether it connects to bidirectional in its beginning (1), end (2), or both (3). Features as a cell array.
zone type
zone period
number of residents
age of residences
high-rise/low-rise
number of private parking spots
price of private parking spots
number of bus lines in the street
number of bus lines in adjacent streets
rate of pay
GIS coordinates (Lattitude, Longitude)
proximity to specific businesses: (A) stadium; (B) movie theater; (C) school, ...

FIG. 8 is a table diagram showing a sample event information table contained by the facility in some embodiments. The table 800 is made up of rows, such as sample rows 801-802, which are each divided into the following columns: event ID column 811, date column 812, begin time column 813, end time column 814, latitude column 815, longitude column 816, expected attendance column 817, and event type column 818. For example, row 802 indicates that an event having event ID 9211 begins at 7 PM on Nov. 6, 2010 and ends at 9:30 PM. The event is at latitude 41.879036 and longitude −87.624872. It is expected to be attended by 5000 people, and is a symphony event. The latitude and longitude in an event's row can be used to calculate its distance from any segment, which likely affects its impact on the segment.

Figure 9:
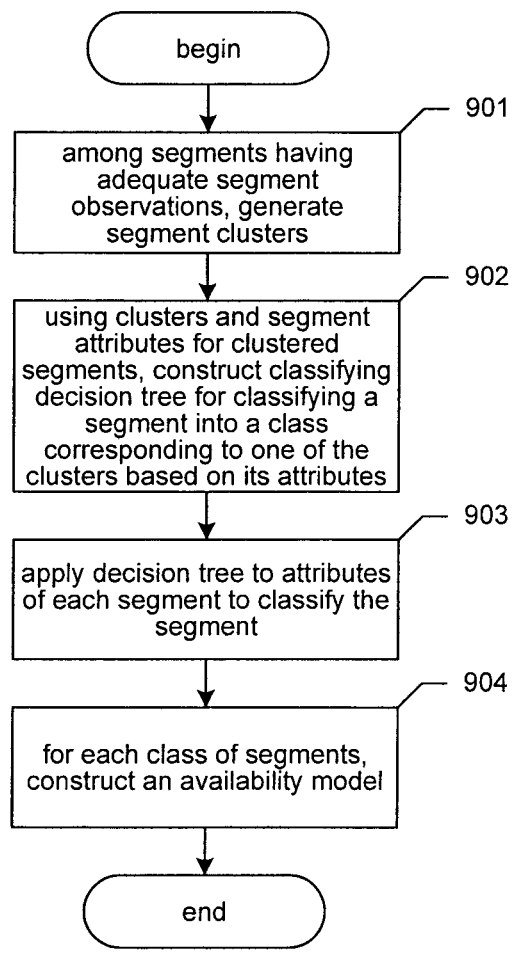
FIG. 9 is a flow diagram showing steps performed by the facility in order to construct segment availability models in some embodiments.

FIG. 9 is a flow diagram showing steps performed by the facility in order to construct segment availability models in some embodiments. In step 901, among segments having adequate segment observations, the facility generates segment clusters. In some embodiments, a segment has adequate segment observations if at least four observations are contained for the segment by the segment availability observations table. For each such segment, the facility fits a polynomial of degree 3 to total number of available spots in the segment as a function of time of day. In some embodiments, the facility uses a K-nearest neighbor clustering algorithm to cluster together segments having similar fitted curves. In some embodiments, the facility uses manual visual evaluation to cluster together segments having similar fitted curves. In various embodiments, the facility establishes a different set of clusters, classifications, and corresponding models for variations of various kinds, such as different time-of-day ranges, and/or different days-of-week or days-of-week ranges.

Figure 10:
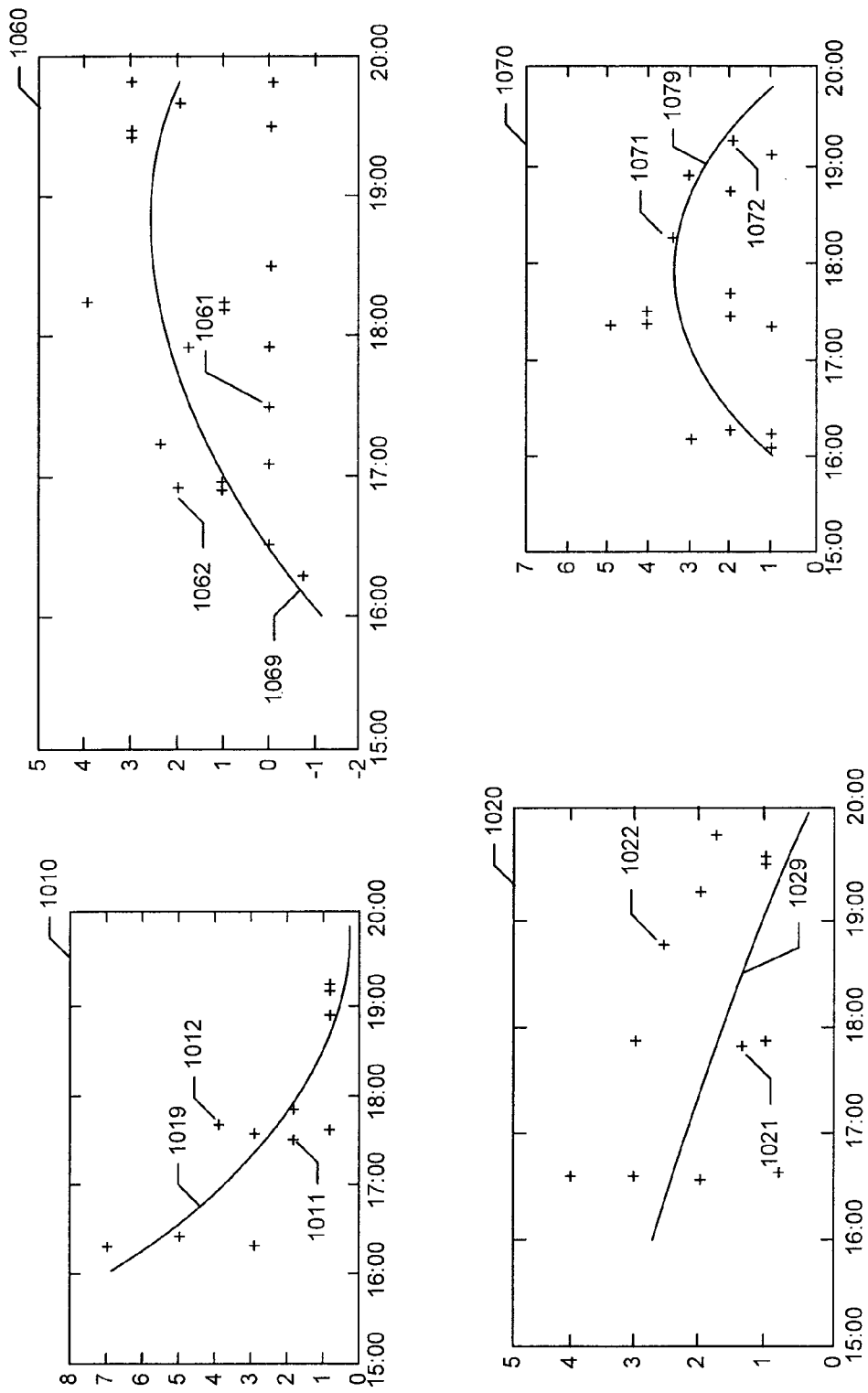
FIG. 10 is a graph diagram showing examples of availability curves fitted to segments that are used as a basis for clustering segments together.
Figure 11:
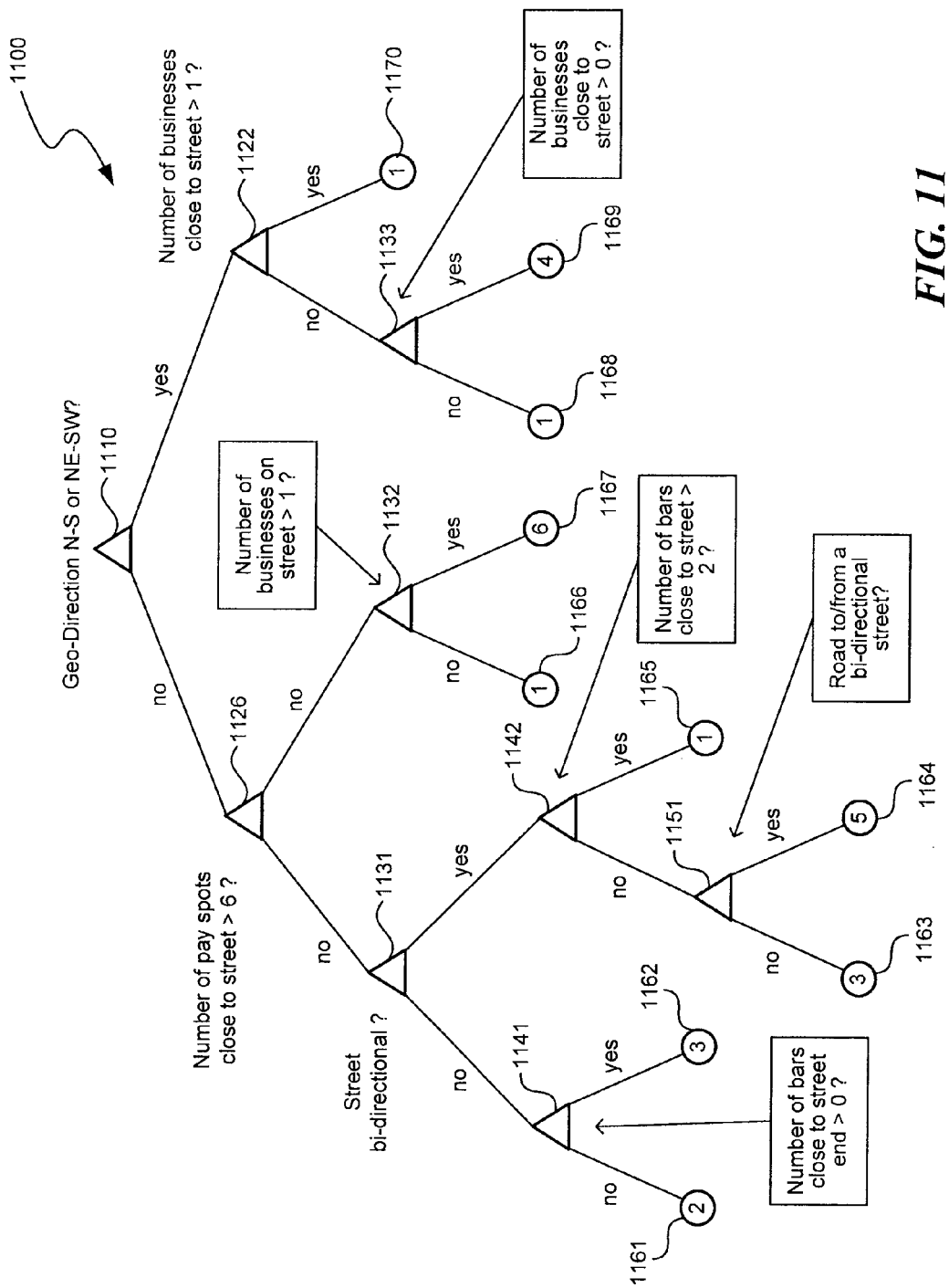
FIG. 11 is a tree diagram showing a sample classifying decision tree constructed by the facility.

FIG. 10 is a graph diagram showing examples of availability curves fitted to segments that are used as a basis for clustering segments together. Graph 1010 for a first segment shows as plus signs total availability observations including total availability observations 1011 and 1012, to which has been fitted curve 1019. Based on a similar curve 1029 having been fitted to a second segment as shown in graph 1020, the facility clusters the first and second segments together. Similarly, a third segment shown in graph 1060 and a fourth segment shown in graph 1070 have been clustered together based upon the similarity of their fitted curves 1069 and 1079. In some embodiments, the facility records the results of the clustering by storing cluster IDs in cluster column 719 shown in FIG. 7.

Returning to FIG. 9, in step 902, the facility uses the clusters generated in step 901, together with the segment attributes for the cluster segments, to construct a classifying decision tree that classifies a segment into a class corresponding to one of the clusters based upon its attributes. In some embodiments, the facility uses an ID3 algorithm to construct this decision tree. In some embodiments, the facility constructs the decision tree in accordance with J. R. Quinlan, Induction of decision trees, Machine Learning, 1:81-106, 1986, which is hereby incorporated by reference in its entirety. In step 903, the facility applies the decision tree constructed in step 902 to attributes of each segment in turn to classify the segment. In some embodiments, the facility records the results of the classification by storing class IDs in class column 720 shown in FIG. 7.

FIG. 11 is a tree diagram showing a sample classifying decision tree constructed by the facility. The tree 1100 has a root node 1110; intermediate nodes 1121, 1122, 1131, 1132, 1133, 1141, 1142, and 1151; and leaf nodes 1161-1170. The facility uses the tree to classify a segment by beginning at the root node, and successively following the branch from the current node whose condition is satisfied by the segment's attributes, until a leaf node is reached. At that point, the class number recorded in the leaf node is attributed to the segment being classified. For example, for a segment of an East-West Street that has four businesses and four nearby paid spots, the facility applies the tree as follows: The facility begins at root node 1110. Because the segment's East-West direction satisfies the condition of the branch from node 1110 to node 1121, the facility traverses this branch to node 1121. At node 1121, because the segment's four pay spots satisfy the condition of the branch from node 1121 to node 1132, the facility traverses this branch to node 1132. At node 1132, because the segment's four businesses satisfy the condition of the branch from node 1132 to node 1167, the facility traverses this branch to leaf node 1167. Having reached leaf node 1167, the facility attributes to the segment the class ID specified for this leaf node, 6.

Returning to FIG. 9, in step 904, for each class of segments, the facility constructs an availability model. In some embodiments, the facility constructs a polynomial regression model for each class of segments. In some embodiments the facility constructs a Bayesian network model for each class of segments. In various embodiments, the facility uses various combinations of segment attributes and contextual values as independent variables for the model it constructs. In some embodiments, the facility uses the following independent variables:

TABLE 2

| |
| --- |
| Time of day |
| Day of week |
| Holiday (yes/no) |
| Weather (snow/rain/sunny/cloudy) |
| Geo-direction of street |
| Number of bars at end of street |
| Number of businesses close to beginning of street |

In various embodiments, the facility constructs models that are differentiated on various axes, including spot size and spot type. For example, in some embodiments, for users that will accept both large and small spots and both free and paid spots, the facility constructs a "large and small spots, free and paid spots" model using observations from the included segments that specify either large or small spots, and other free or paid spots. In some embodiments, the facility constructs different sets of models for different bases for varying its clustering process, such as different time-of-day ranges.

After step 904, these steps conclude.

Figure 12:
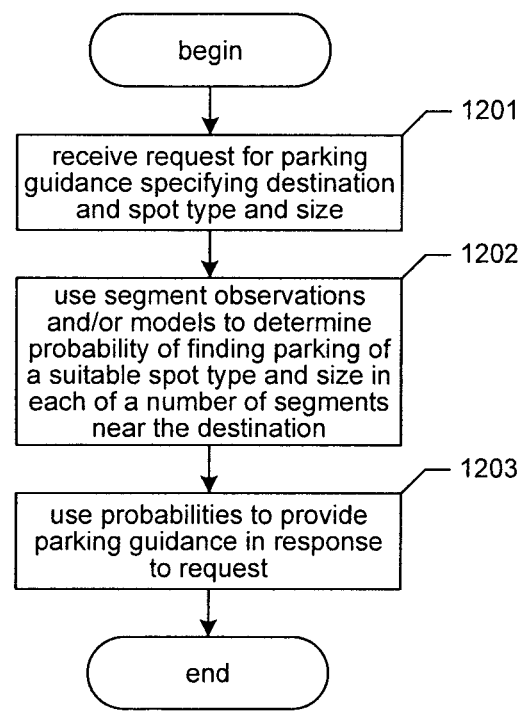
FIG. 12 is a flow diagram showing steps performed by the facility in order to provide parking guidance in some embodiments.

FIG. 12 is a flow diagram showing steps performed by the facility in order to provide parking guidance in some embodiments. In step 1201, the facility receives a request for parking guidance specifying a destination and a spot type and size.

Figure 13A:
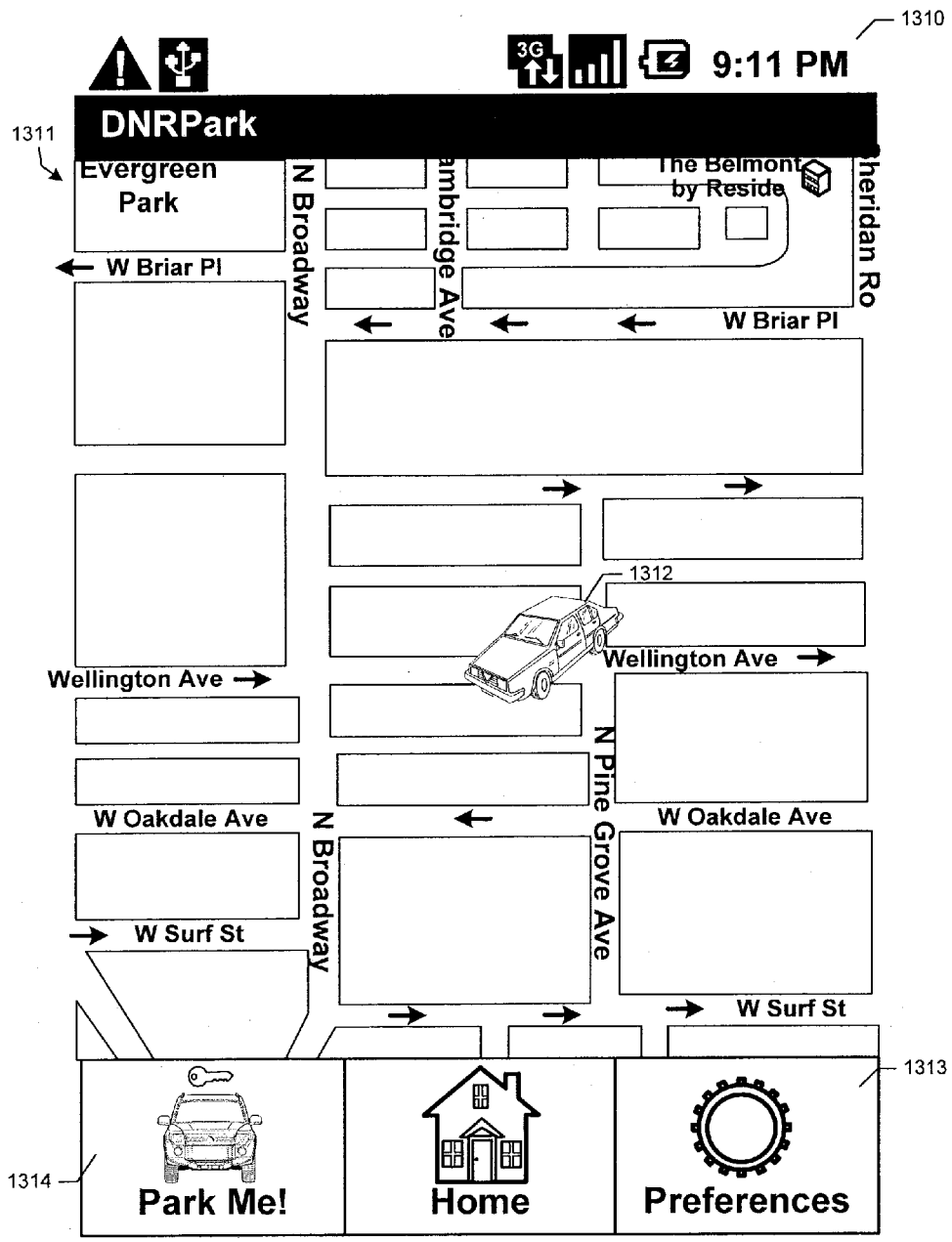
FIGS. 13A-13C are user interface diagrams showing sample displays presented by the facility in a parker client in some embodiments as part of providing a recommended route for searching for parking.
Figure 13B:
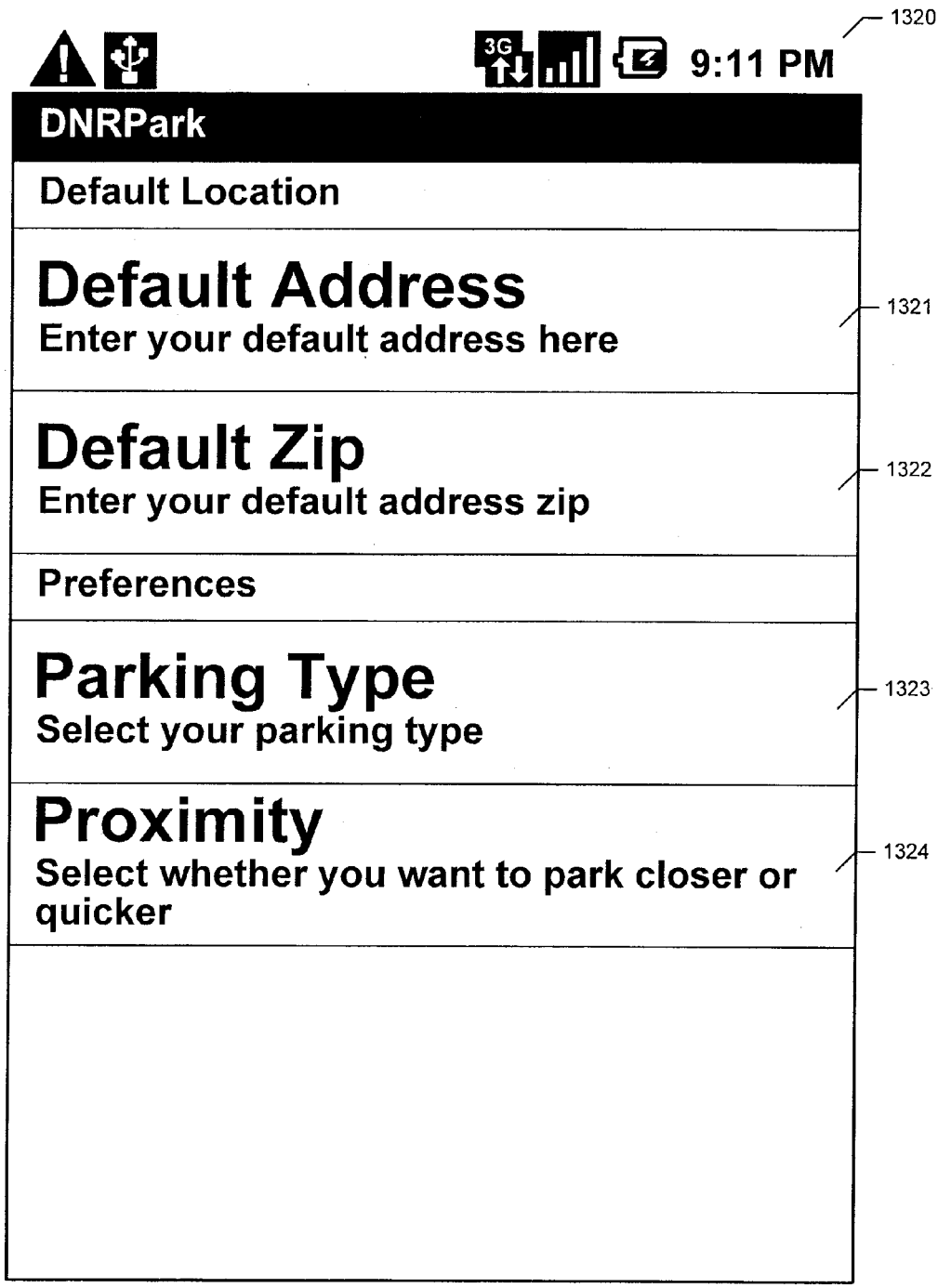
Figure 13C:
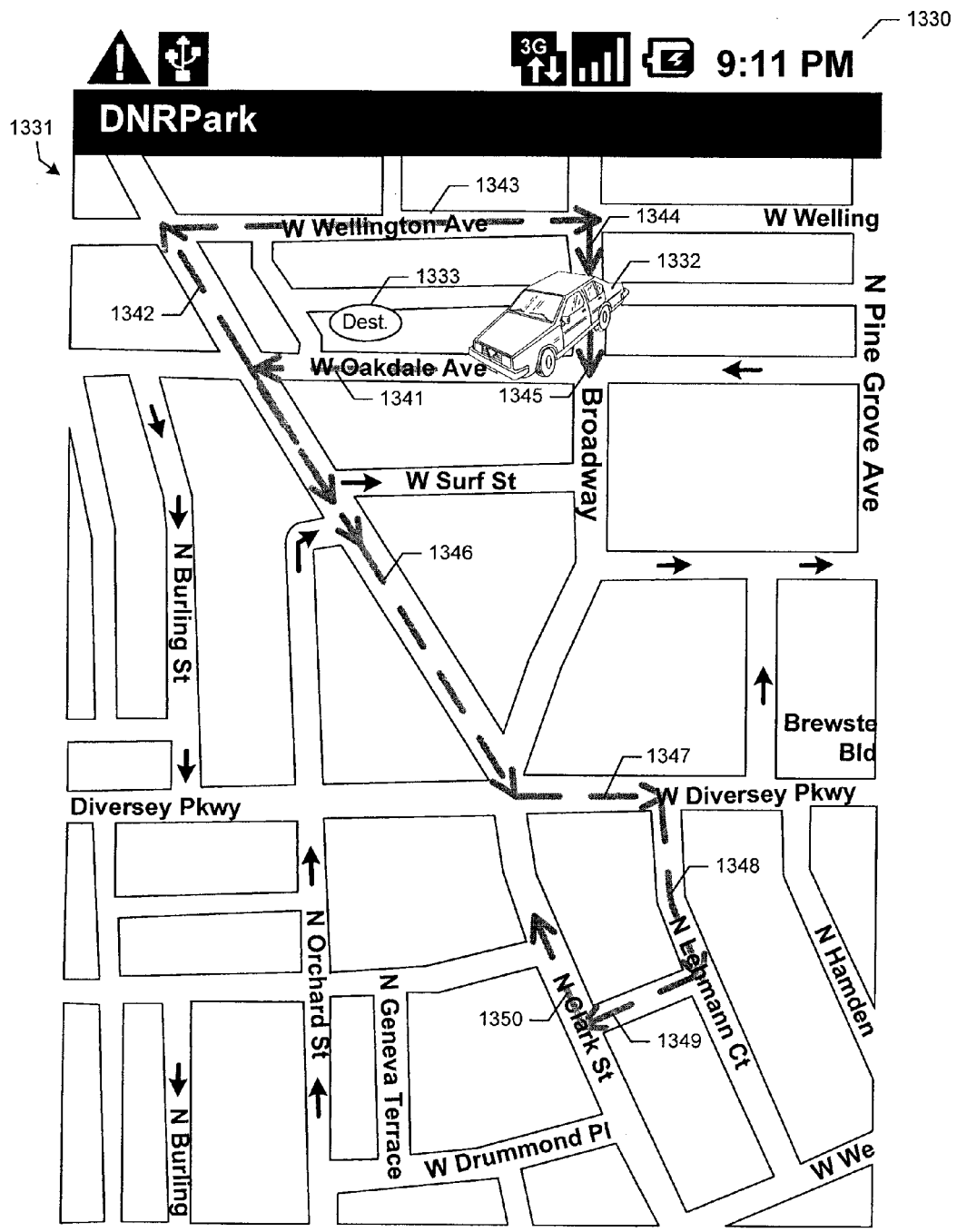

FIGS. 13A-13C are user interface diagrams showing sample displays presented by the facility in a parker client in some embodiments as part of providing a recommended route for searching for parking. FIG. 13A shows an initial display 1310. The display includes a map 1311 showing the user's current location 1312. The user can press the preferences button 1313 in order to set certain parking preferences, select a destination on the map, then press a park me button 1314 in order to request a recommended route for searching for parking near the destination.

FIG. 13B shows a subsequent display 1320 reached by pressing the preferences button 1313. This display 1320 includes controls 1321 and 1322 for setting a default parking address and zip code, such as the parker's home address. The display further includes a control 1323 for setting of the spot size and type desired by the parker, and a control 1324 for specifying whether the parker prefers to optimize the recommended route for a shorter driving route to the spot, or for a shorter walking route from the spot to the destination, both in terms of either distance or estimated driving/walking time.

Returning to FIG. 12, in step 1202, the facility uses segment observations and/or models to determine the probability of finding parking of a suitable spot type and size in each of a number of segments near the destination. In step 1203, the facility uses the probabilities determined in step 1202 to provide parking guidance in response to the request. After step 1203, these steps conclude.

FIG. 13C shows a subsequent display 1330 reached by using display 1322 establish user preferences, selecting a destination on display 1310, and pressing the park me button. This display 1330 contains a map 1331. The map indicates the current location 1332 of the user, the destination location 1333, and a series of legs 1341-1350 making up a recommended route for searching for parking. In various embodiments, this recommended route is communicated to the user in a variety of ways, including textual, graphical, or spoken turn-by-turn directions; a complete textual list of turns to make, such as a list displayed on a webpage or in a text message or e-mail message; etc.

In some embodiments, the facility determines the recommended route by approaching it as a special case of a Partially-Observable Markov-Decision Process (POMDP) that is created automatically for a radius of exploration acceptable to the driver. For every street segment s, the facility assigns a reward, R(s), associated with parking there (proportional to the walking distance of the street to the requested target and the time to arrive there by driving the current route) and a probability of transitioning to the state in which that street has parking at the same time as the user's car being there. The value per path is then defined and calculated as $$\text{Value(path)} = \text{length(path)} \; E \; i =$$
$$1 \; R(si)\_Pr(si \text{ has parking} | s1; \ldots, si\text{-}1 \text{ had no parking})$$

$$\text{Value(path)} = \sum_{i=1}^{length(path)} R(s_i) * $$
$$Pr(s_i \text{ has parking} | s_1 \ldots, s_{i-1} \text{ had no parking})$$

Every GIS data set for a city defines a directed graph between street segments. Every street segment (from intersection to intersection) can lead to other streets via an intersection that may restrict some transitions. While a segment may have no parking available now, it may still have parking in 1 minute, but with probability that should take into account the fact that right now there is no parking there. The facility infers that a street visited on a path has no parking (otherwise, the user would have parked there, and stopped searching). Driving one more street costs the user time and frustration. The facility quantifies this cost as proportional to the number of turns that the user makes (making it more painful to make left turns) and the street length. The facility also establishes a reward for finding parking in that segment, simulating a reward that a user feels when he finds parking there. That reward is inversely-proportional to the walking distance to the requested destination. Finding the optimal route to search for parking is often not computationally easy. In fact, finding the optimal route often requires taking time that is exponential in the number of segments involved. Accordingly, in some embodiments, the facility applies two techniques. First, the facility approximates an exhaustive search by limiting paths to those of bounded lengths (e.g., 16 steps). Secondly, the facility uses a branch-and-bound search technique to discard paths that are clearly going to be sub-optimal given what has been explored so far (i.e., the facility already found (in its search so far) a path that gives a better value than any possible extension of the current path.

In some embodiments (not shown), rather than assuming a static driving time for each segment in determining a route, the facility uses current traffic conditions in order to dynamically attribute a driving time to each segment for use in determining the recommended route.

In some embodiments (not shown), the facility presents a recommended route that begins at a starting location, such as a starting location entered by the user, or a starting location determined based upon the user's current location. In such embodiments, navigation and parking goals are both served by a single recommended route.

FIG. 14 is a user interface diagram showing a sample display presented by the facility in a parker client in some embodiments that shows the probability of finding parking in different segments near the destination. The display 1400 includes a map 1410. In addition to the user's current location 1421 and the destination 1422, the map shows segments 1431-1454 near the destination. Each of the segments is color and/or pattern coded to indicate the likelihood that suitable parking will be found in that segment. A legend 1460 shows the range of probabilities associated with each pattern and/or color. Based on the information the map, the user may head to segment 1436, which offers a very high likelihood of finding parking. Alternatively, the user may choose to explore Third Street, which has a reasonably high likelihood of finding parking in several segments in a row. In various embodiments, the facility uses various approaches to indicating the probability of finding parking in the segment. In some embodiments (not shown), the facility labels each segment with a numerical indication of the probability of finding parking in that segment.

FIG. 15 is a user interface diagram showing a sample display presented by the facility in a parker client in some embodiments that shows the amount of time the facility predicts it will take for the user to find parking near the destination. The display 1500 includes a map 1510 that shows the user's present location 1521 and the destination 1522. The display further includes an indication 1571 of the amount of time the facility predicts it will take the user to find parking without using a route recommended by the facility, and having indication 1572 of the amount of time the facility predicts it will take for the user-defined parking using a route recommended by the facility. In some embodiments, indication 1572 is a button that the user can press in order to obtain a route recommended by the facility.

In some embodiments, the facility determines the amount of time to predict using a recommended route by (1a) without displaying it, constructing a recommended route; (2a) for each segment in the route, using an average traffic flow rate for the segments in the route to determine the total amount of time it will take to drive to the segment in the route; and (3a) computing a weighted average of these driving times in which each is weighted by the contingent probability of finding parking for the first time in the segment.

In some embodiments, the facility determines the amount of time to predict without using a recommended route by (1b) selecting multiple random routes that pass near the destination; (2b) performing steps (2a) and (3a) described above for each of the random routes; and (3b) averaging the results.

In some embodiments, the facility provides differing versions of the user interface shown in FIG. 15. As one example, in some embodiments, the facility determines a predicted parking time for one or more neighborhoods. For each neighborhood, the facility determines an expected parking time for a number of different destinations within the neighborhood, such as every intersection in the neighborhood. The facility proceeds to aggregate these determined parking times for each neighborhood, using such aggregation functions as mean, median, etc. As another example, in some embodiments, the facility simultaneously displays expected parking times for multiple destinations, such as different destinations that each play a supplementary role to the user relative to one another. As one example, if the user has indicated her interest visiting a library branch, in some embodiments, the facility identifies the nearest five library branches, and for each, determines and displays an estimated driving time, an estimated parking time, and an estimated total time to reach the library and park.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

I claim:

1. A computer-readable storage device having contents capable of causing a computing system to perform a method for providing guidance for locating street parking, the method comprising:
   receiving an indication of a geographic location;
   determining an effective time for which to provide guidance;
   identifying a first plurality of parking segments near the indicated geographic location;
   for each of a second plurality of parking segments comprising a subset of the identified first parking segments, determining a probability that available street parking will exist in the parking segment at the effective time;
   using the determined probabilities to determine a recommended path for seeking parking among a third plurality of parking segments comprising a subset of the second plurality of parking segments, wherein the recommended path is determined using expected travel times between the parking segments of the third plurality; and
   causing the determined recommended path to be presented to a user.

2. The computer-readable storage device of claim 1 wherein the effective time is determined to be a time at which the indication of the geographic location is received.

3. The computer-readable storage device of claim 1 wherein the effective time is determined to be a time by which the user is expected to travel to the indicated geographic location.

4. The computer-readable storage device of claim 1 wherein the effective time is determined to be a time explicitly specified by the user.

5. The computer-readable storage device of claim 1 wherein the causing causes a visual map depicting the determined recommended path to be presented to the user.

6. The computer-readable storage device of claim 1 wherein the causing causes textual directions describing the determined recommended path to be presented to the user.

7. The computer-readable storage device of claim 1 wherein the causing causes a prompt for each turn in the determined recommended path to be presented to the user approximately when the turn must be made.

8. The computer-readable storage device of claim 1 wherein determining the recommended path comprises:
   identifying a plurality of candidate paths for each of which a likelihood of finding available street parking anywhere in the candidate path exceeds a threshold;
   for each of at least a portion of the identified candidate paths, scoring the candidate path in a manner that characterizes the extent to which the candidate path satisfies one or more suitability criteria; and
   determining the recommended path to be the scored candidate path whose score characterizes it as satisfying the suitability criteria to the greatest extent among the scored candidate paths.

9. The computer-readable storage device of claim 8 wherein one of the suitability criteria is minimizing the driving distance contained in the path.

10. The computer-readable storage device of claim 8 wherein one of the suitability criteria is minimizing a driving time anticipated for seeking parking using the path.

11. The computer-readable storage device of claim 10 wherein the method further comprises determining the anticipated driving time based upon current traffic conditions.

12. The computer-readable storage device of claim 8 wherein one of the suitability criteria is minimizing an estimated walking distance to the indicated geographic location attributed to the path.

13. The computer-readable storage device of claim 8 wherein one of the suitability criteria is minimizing an estimated walking time to the indicated geographic location attributed to the path.

14. The computer-readable storage device of claim 1 wherein the determined recommended path begins at a current location of the user.

15. One or more storage devices collectively storing a recommended parking route data structure, comprising:
   an ordered plurality of entries, each entry containing information specifying one of a plurality of parking segments among which a path is recommended for seeking street parking for a destination location at an effective time on the basis of probabilities of finding available street parking in each of a plurality of parking segments near the destination location, wherein the recommended path is determined using expected travel times between the parking segments of the plurality, such that contents of the data structure are usable by a user to seek street parking using the path.

16. A method in a computing system for characterizing availability of a distinguished parking segment, comprising:
   identifying at least one parking segment as being analogous to the distinguished parking segment; and
   storing an indication that parking availability data collected for one or more of the identified parking segments describes the distinguished parking segment, wherein the distinguished parking segment and the identified parking segments all have segment attributes, wherein the identified parking segments are identified as being analogous to the distinguished parking segment based upon a similarity of at least a portion of the segment attributes of the identified parking segments to at least a portion of the segment attributes of the determined parking segment, wherein the identification of the identified parking segment as being analogous to the distinguished parking segment is performed by applying automatic categorization techniques to the segment attributes of parking segments including the distinguished parking segment and the identified parking segments.

17. The method of claim 16 wherein the identification is performed based upon user input.

18. The method of claim 16 wherein the identification of the identified parking segment as being analogous to the distinguished parking segment is performed by applying a classifying decision tree to the segment attributes of parking segments including the distinguished parking segment and the identified parking segments.

19. The method of claim 18, further comprising constructing the classifying decision tree such that it classifies into a distinguished class parking segments including the distinguished parking segment and the identified parking segments having parking availability observations that show parking availability levels of the parking segments to vary similarly over time of day based upon their segment attributes.

20. The method of claim 19, further comprising automatically determining that the parking availability levels of two or more parking segments vary similarly over time of day based upon their parking availability observations.

21. The method of claim 16, further comprising outputting an indication of the availability of street parking in the distinguished parking segment that is based on the parking availability data attributed to the distinguished segment.

22. The method of claim 16 wherein the at least a portion of the segment attributes of the identified parking segments and the at least a portion of the segment attributes of the determined parking segment both include at least one segment attribute that is both unrelated to geographic location of parking segments and unrelated to physical proximity of parking segments.

23. The method of claim 16, further comprising:
   accessing a first plurality of parking availability observations each from one of the identified parking segments;
   accessing a second plurality of parking availability observations each from one of the distinguished parking segments; and
   training a first parking availability model using the parking availability observations of both the first and second pluralities of parking availability observations.

24. The method of claim 23, further comprising:
   receiving a request to predict parking availability in a specified parking segment;
   in response the determining that the specified parking segment is among the identified parking segments, applying the first model in service of the received request; and
   in response the determining that the specified parking segment is the distinguished parking segment, applying the first model in service of the received request.

25. A method in a computing system for characterizing availability of a distinguished parking segment, comprising:
   identifying at least one parking segment as being analogous to the distinguished parking segment;
   storing an indication that parking availability data collected for one or more of the identified parking segments describes the distinguished parking segment;
   receiving an indication from a person who visited a selected parking segment among the identified parking segments at an observation time of a level of parking availability in the selected parking segment at the observation time; and
   in response to determining that the observation time of the received indication is no more than a threshold amount of time from a current time, attributing to the distinguished parking segment availability data for the selected parking segment that is based on the level of parking availability indicated by the received indication for the selected parking segment in determining the probability, to the exclusion of at least one earlier historical observation for the selected parking segment.

\* \* \* \* \*